US005899318A

United States Patent [19]

Schwer et al.

[11] Patent Number: 5,899,318

[45] Date of Patent: May 4, 1999

[54] DEVICE FOR TRANSPORTING FLAT ARTICLES

[75] Inventors: Wolfgang Schwer, Konstanz; Bernd Bulle, Allensbach, both of Germany

[73] Assignee: Licentia Patent-Verwaltungs GmbH, Frankfurt, Germany

[21] Appl. No.: 08/663,136

[22] PCT Filed: Oct. 16, 1995

[86] PCT No.: PCT/EP95/04056

§ 371 Date: Sep. 20, 1996

§ 102(e) Date: Sep. 20, 1996

[87] PCT Pub. No.: WO96/11869

PCT Pub. Date: Apr. 25, 1996

[30] Foreign Application Priority Data

| | | | |
|---|---|---|---|
| Oct. 18, 1994 | [DE] | Germany | 44 37 110 |
| Oct. 18, 1994 | [DE] | Germany | 44 37 114 |

[51] Int. Cl.[6] .......... B65G 15/12

[52] U.S. Cl. .......... 198/604; 271/198; 198/607; 198/626.1

[58] Field of Search .......... 198/604, 607, 198/626.1, 626.2, 605; 271/198

[56] References Cited

U.S. PATENT DOCUMENTS

| | | | |
|---|---|---|---|
| 2,076,493 | 4/1937 | Beardsley . | |
| 3,467,063 | 9/1969 | Brinkley et al. | 198/607 |
| 3,973,770 | 8/1976 | Montenbruck . | |
| 4,171,129 | 10/1979 | Daley et al. . | |
| 5,143,225 | 9/1992 | Rabindran et al. . | |

FOREIGN PATENT DOCUMENTS

| | | | |
|---|---|---|---|
| 0115916 | 8/1984 | European Pat. Off. . | |
| 583761 | 1/1925 | France | 198/626.1 |
| 1357317 | 7/1985 | U.S.S.R. | 198/607 |
| 641872 | 8/1950 | United Kingdom | 198/626.1 |
| 2249543 | 5/1992 | United Kingdom . | |
| 2265131 | 9/1993 | United Kingdom | 198/607 |

*Primary Examiner*—Joseph E. Valenza
*Assistant Examiner*—Joe Dillon, Sr.
*Attorney, Agent, or Firm*—Venable; George H. Spencer; Norman N. Kunitz

[57] ABSTRACT

A device for transporting flat articles with a cover belt system consisting of a lower and an upper belt, between which the articles are transported, and a deflection mechanism for deflecting the cover belt run. The deflection mechanism has one or more main cylinder rollers and one or more secondary rollers and the upper belt is guided around the main cylinder roller and the lower belt over the secondary cylinder roller, such that the lower belt is guided past the main cylinder roller in such a way that the articles are transported in the deflection mechanism between the upper belt and the main cylinder roller. A short guide belt may be provided around the main cylinder roller and an additional secondary cylinder roller disposed between the main cylinder roller and the secondary cylinder roller guiding the lower belt at the output of the deflection mechanism.

18 Claims, 5 Drawing Sheets

DEVICE FOR TRANSPORTING FLAT ARTICLES

DESCRIPTION

The present invention at hand relates to a device for transporting flat articles of the type including (Insert A).

In letter sorting machines, in particular address readers, flat articles are transported by means of cover belts, consisting of an upper and a lower belt. Such a transport takes place especially in dynamic storage segments where the articles are stored mechanically after the address scanning until the reading result is delivered by the electronic reading device and a code corresponding to the reading result can be printed onto the articles. A multiple deflection of the cover belt run is necessary especially in the storage segments to keep the required space at a minimum. In the course of this, the cover belt is generally guided over large cylinder rollers, during which the cover belt movement is deflected by 180° or 90°. One problem that occurs with the deflection around large cylinder rollers is that differential speeds occur between upper and lower belt. These differential speeds between the belts lead to a gap offset between the transported articles. Since a flawless tracking of the articles is necessary for the aforementioned devices, the gap offset between the articles must be kept as small as possible. One option of reducing the speed differential between lower and upper belt is, for example, if the upper belt is kept as short as possible around the cylinder roller. With respect to design, this can be achieved by using a larger number of cylinder rollers and belts. However, this requires more space and a higher installed drive power.

Thus, it is the object of the invention at hand to create a device for transporting flat articles for which no differential speeds occur between lower and upper belt during the deflection of the cover belt run.

SUMMARY OF THE INVENTION

The above object is achieved in accordance with one embodiment of the invention by a device for transporting flat articles with a cover belt consisting of a lower belt and an upper belt between which the articles are transported, and with a deflection mechanism for deflecting the cover belt run, and wherein: the deflection mechanism has one or more main cylinder rollers and one or more secondary cylinder rollers; the upper belt is guided around the main cylinder roller and the lower belt is guided over the secondary cylinder rollers, so that the lower belt is guided past the main cylinder roller such that the articles are transported in the deflection mechanism between the upper belt and the main cylinder roller; ask additional secondary cylinder roller is coordinated with the main cylinder roller and is arranged between the main cylinder roller and one of the secondary cylinder rollers that guide the lower belt; and a short elastic belt is placed around the main cylinder roller and the coordinated secondary cylinder roller such that the short belt provides a guide for articles that are outgoing in the area of the main cylinder roller to the transfer point (C) of the cover belt. Advantageous exemplary embodiments and features of the invention are disclosed and described.

The invention is explained in detail below with the aid of drawings.

DETAILED DESCRIPTION OF THE PREFERRED EMBODIMENT

Figure 1:
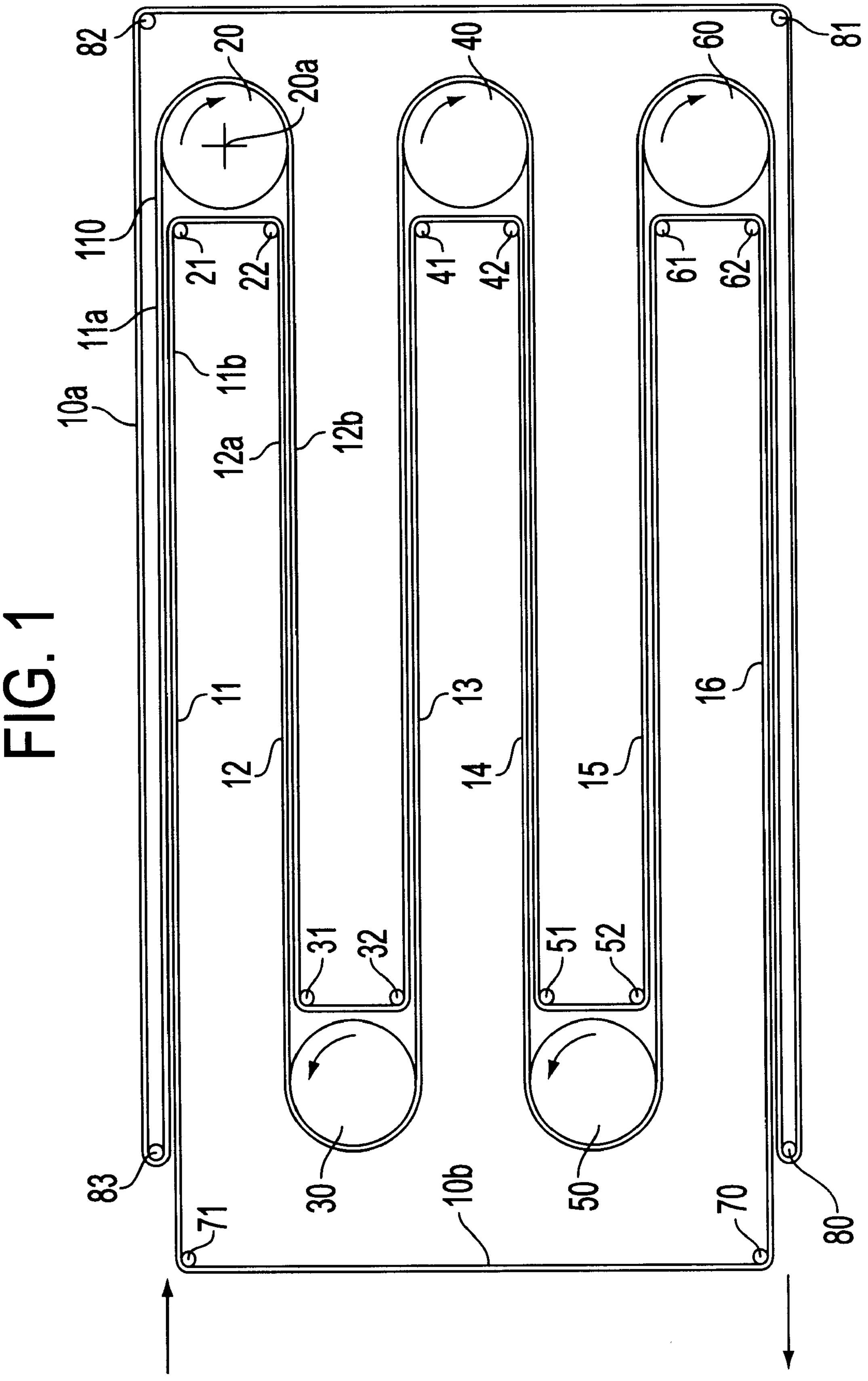
FIG. 1 is an exemplary embodiment of the basic invention for a meandering storage segment.

FIG. 1 shows a meandering storage segment with two endless transport belts 10*a* and 10*b*. The conveyor belts 10*a* and 10*b* are guided along the linear segments 11, 12, 13, 14, 15, 16 such that a cover belt, consisting of an upper belt and a lower belt is formed, between which belts the articles are transported without friction. The cover belt run is deflected at respective deflection mechanisms containing roller combinations 20-21-22, 30-31-32, 40-41-42, 50-51-52, or 60-61-62. The design and operation of the deflection mechanism is explained in detail in the following with the aid of roller combination 20-21-22. The diameter for the main cylinder roller 20 is selected such that a damage-free transport between cylinder roller and upper belt 11*a* is ensured. The lower belt 11*b* is guided over secondary cylinder rollers 21 and 22. The secondary cylinder rollers 21 and 22 are placed as close as possible to cylinder roller 20, so that the articles are transferred securely from the linear segment 11 of the cover belt for further transport in the area of cylinder roller 20. In particular, cylinder rollers 21 and 22 are placed in relation to each other and with respect to cylinder roller 20 in such a way that the lower belt 11*b* and the upper belt 11*a* or the lower belt 12*a* and the upper belt 12*b* are guided parallel and at such a short distance from each other that the transport of articles on the linear areas 11, 12 of the cover belt run is ensured without friction. As a result of the meandering design of the storage segment, the successive segments 11*b*, 12*a* of the conveyor belts serve alternately as lower or upper belt. The same is true respectively for the segments 12 and 13, 13 and 14, 14 and 15, 15 and 16 of the cover belt run. Since the conveyor belt in each case is not guided in a double layer as cover belt over the large roller 20, but alternately as upper belt 11*a* or lower belt 11*b* over the main cylinder roller 20 or the secondary cylinder rollers 21 and 22, the problem of developing differential speeds between upper and lower belt is avoided.

The transport of the flat articles in the area of the deflection mechanism with cylinder rollers 20, 21 and 22 is shown in the following. An article 100 is moved to the linear range of the cover belt in arrow direction to cylinder roller combination 20, 21 and 22. As soon as the front edge of the transported article projects over the radius of cylinder roller 21, the article is transferred to cylinder roller 20. It belongs to the range of expert installation to dimension the rollers 20, 21 and 22 with respect to radius and distance to each other, such that a secure transfer takes place even for the shortest article allowed. During the transfer, the front edge of the article is pushed into the contact range between cylinder roller 20 and upper belt 11*a* and subsequently transported without friction between upper belt 11*a* and cylinder roller 20 around rotational axis 20*a*. The front edge of the article is then moved to the area of cylinder roller 22, between lower belt 12*a* and upper belt 12*b*. Thereupon a transport to the roller combinations 30-31-32, 40-41-42, 50-51-52 and 60-61-62 takes place, followed by a subsequent transfer to the linear segment 16 of the cover belt run. The endless conveyor belt 10*a* is deflected via cylinder rollers 80, 81, 82 and 83 and the conveyor belt 10*b* via cylinder rollers 70 and 71.

Figure 2:
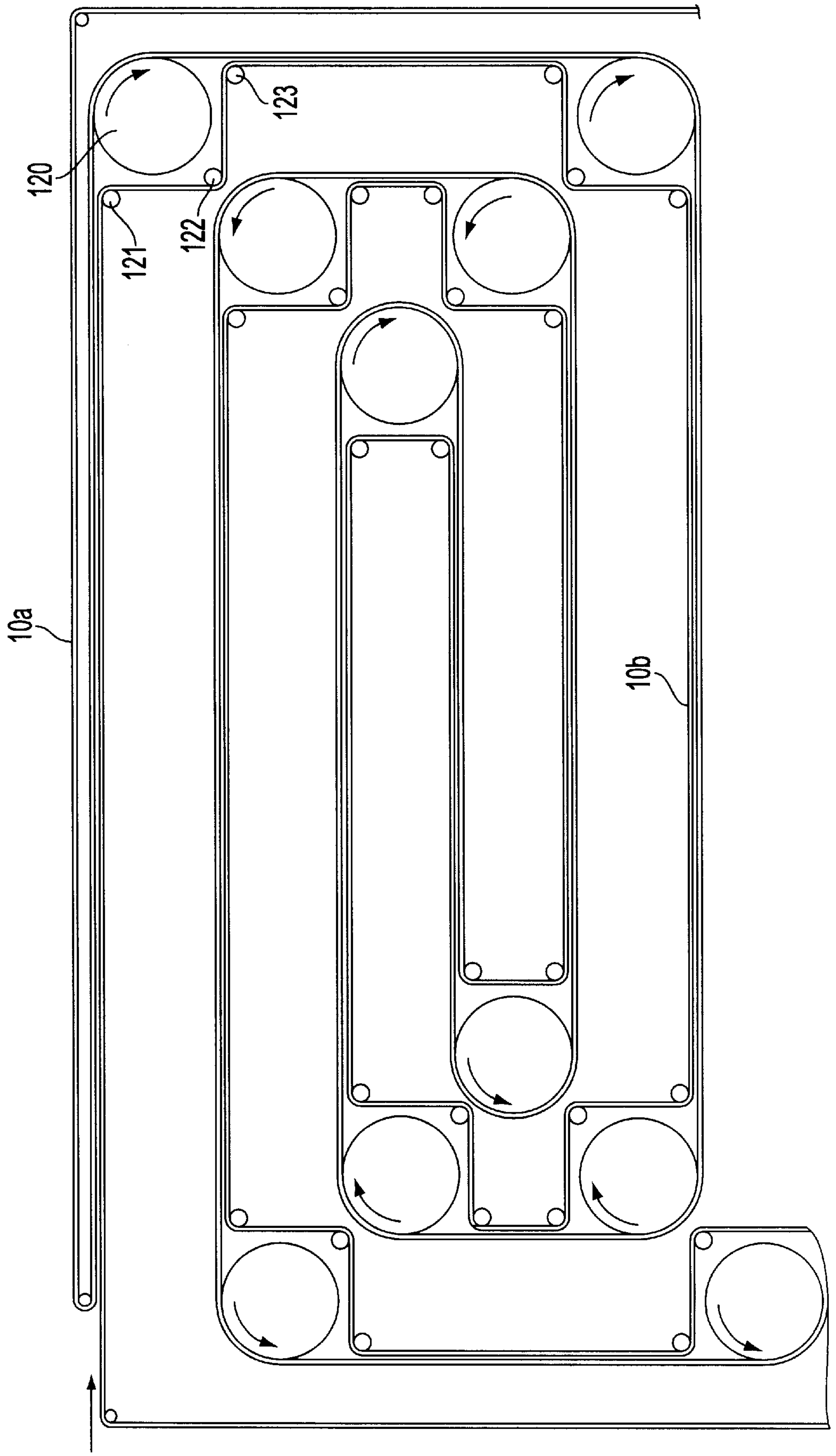
FIG. 2 is an exemplary embodiment of the invention for a worm-shaped storage segment.

FIG. 2 shows another exemplary embodiment of a device according to the invention for a worm-shaped storage segment with several deflection mechanisms. In contrast to the embodiment shown in FIG. 1, the cover belt run here is also deflected by 90°. For that, one of the conveyor belts is guided over the main cylinder roller 120 and the other conveyor belt is guided over the secondary cylinder rollers 121, 122, 123. The conveyor belts 10*a* and 10*b* here are designed as endless belts as well, even though the deflection of the belts, which is required per se for this, is not shown in FIG. 2.

Figure 3A:
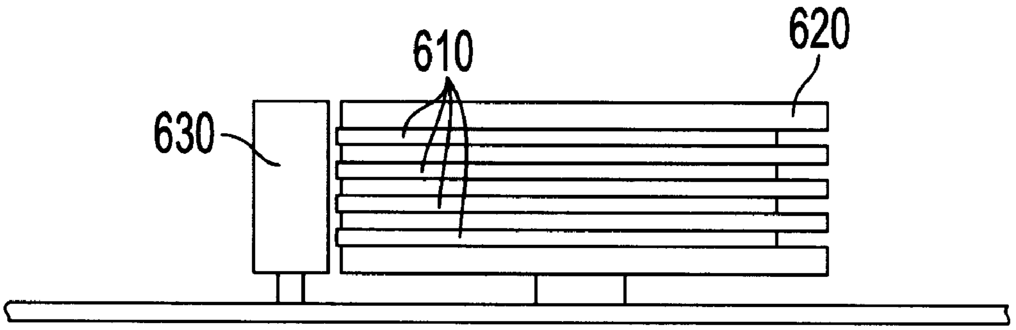
FIGS. 3*a* and 3*b* are side and top views respectively of an exemplary embodiment of the invention with a guide rail.
Figure 3B:
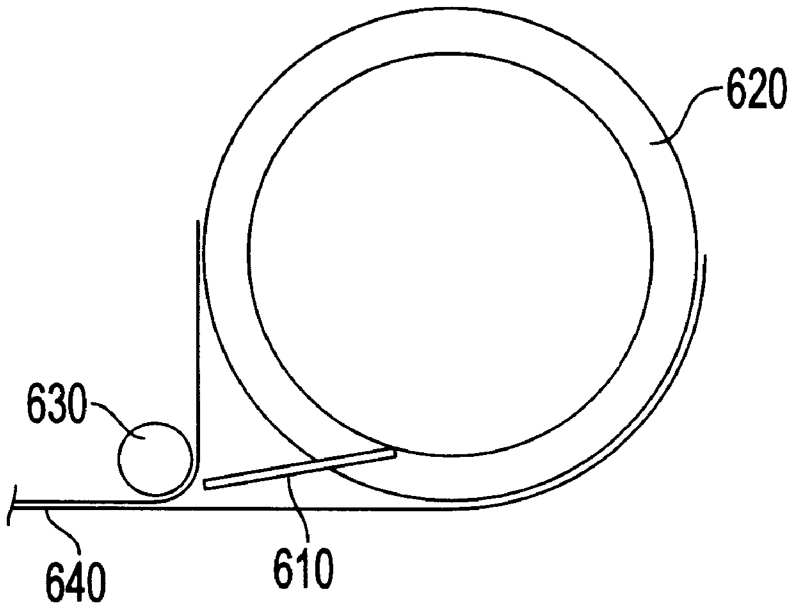

FIG. 3 shows an exemplary embodiment of the device according to the invention with a guide rail to guide outgoing articles from the main cylinder roller 620 to secondary cylinder roller 630. The guide rail 610 is at a sharp angle Å to upper belt 640, so that articles transported around cylinder roller 620 are provided with a force component in the movement direction of upper belt 640. It is preferable if groove-shaped recesses are arranged in the surface of cylinder roller 620, into which the guide rail projects with one of its ends, so that a secure guidance of articles that possibly cling to the cylinder roller surface is ensured. In another embodiment with smaller cylinder rollers, the guide rails can also be arranged above or below the cylinder roller front, which also serves as a guide for articles transported around the cylinder roller.

Figure 4:
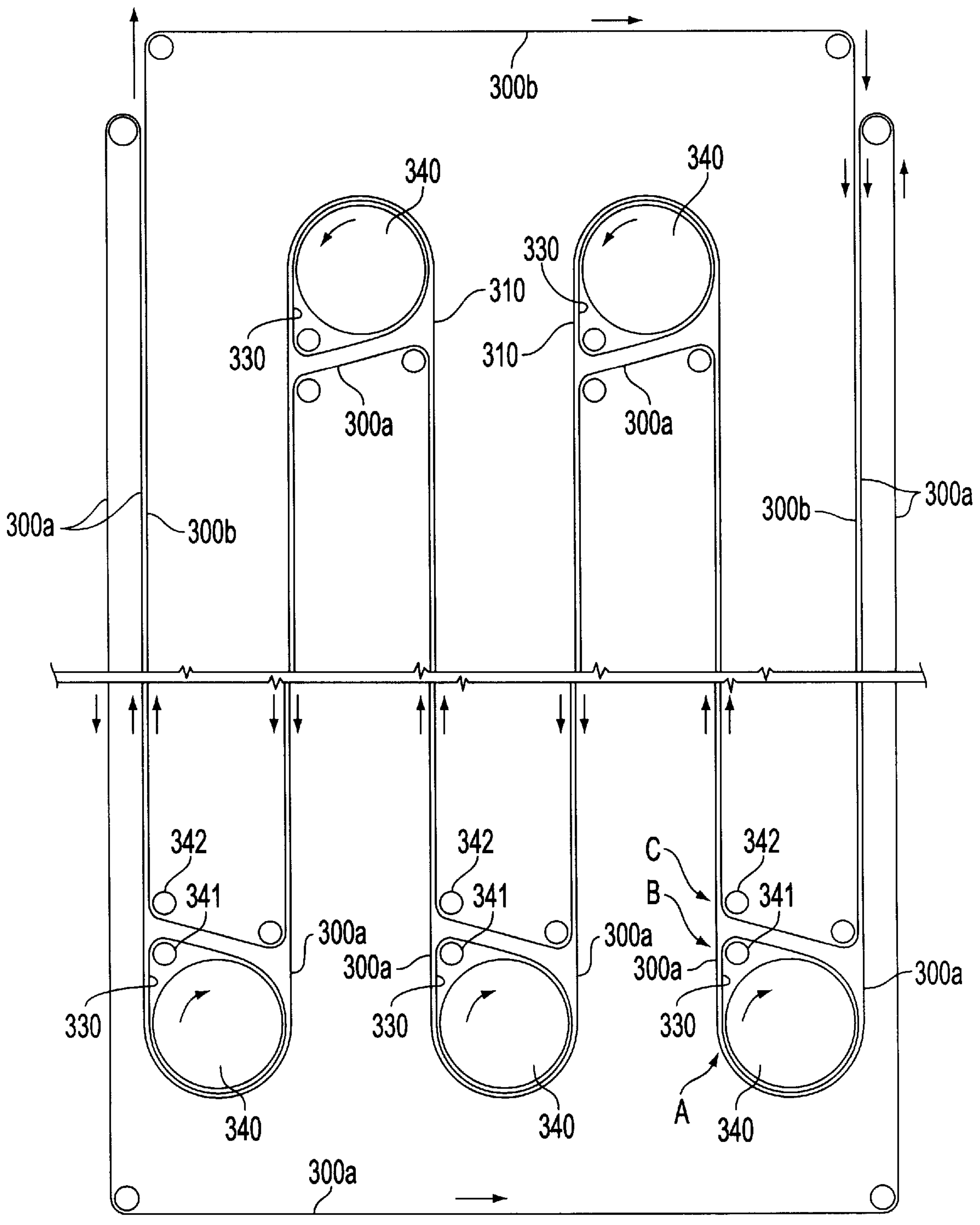
FIG. 4 is an exemplary further embodiment of the invention for a meandering storage segment.

FIG. 4 shows an embodiment of the device according to the invention for a meandering storage segment with two endless conveyor belts 300*a* and 300*b*. In the linear segments between the cylinder rollers, conveyor belts 300*a* and 300*b* are guided in such a way that a cover belt system consisting of cover belt 310 and cover belt 320 is formed. In order to increase the operational safety of the deflection mechanism, a short elastic belt 330 is placed around the main cylinder roller 340 and the secondary cylinder roller 341. The secondary cylinder roller 341 is arranged between the main cylinder roller 340 and the secondary cylinder roller 342, which guides the lower belt 310. The secondary cylinder rollers 341 and 342 are both arranged in the direction of the linear extending segment of cover belt 320, 310. In the area where the upper belt 320 tangentially adjoins cylinder roller 340 and secondary cylinder roller 341, a guide is provided by the belt 330 for outgoing articles to the transfer point C of cover belt 310, 320 because the articles are here transported between the upper belt 320 and the guide belt 330. This is particularly advantageous for the transport of thin and unstable articles, which show warping or have a static charge. A differential speed cannot be ruled out completely in this range between A and B, but is accepted because of the aforementioned advantages.

Figure 5:
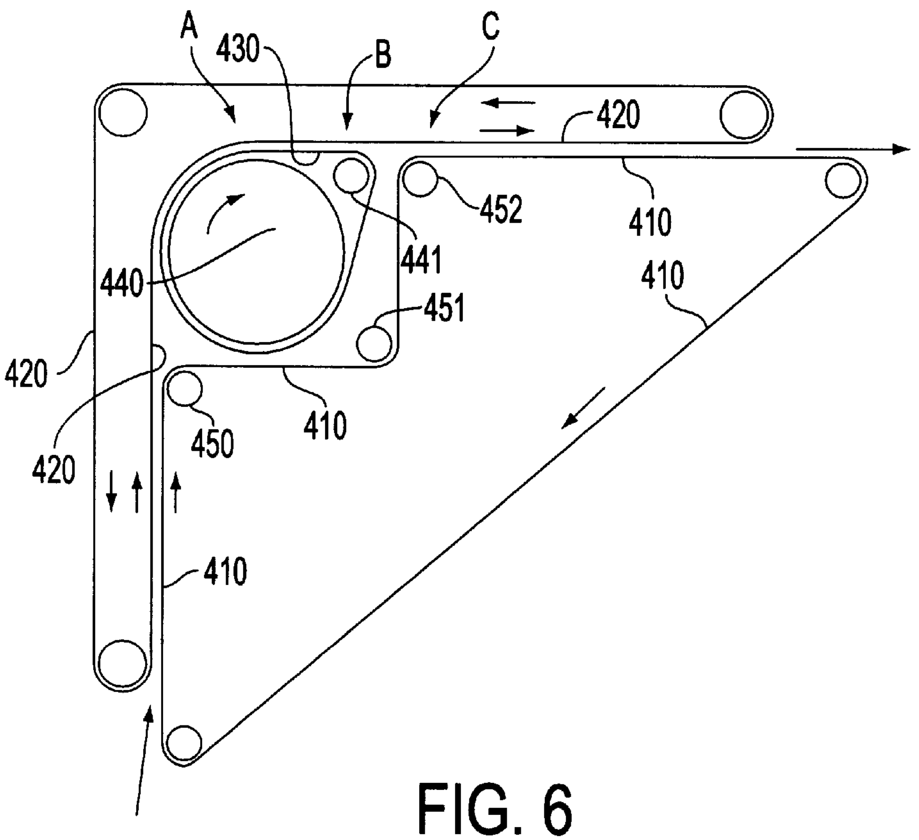
FIG. 5 is an exemplary embodiment of the invention FIG. 4 with a 90° corner deflection.

With the exemplary embodiment of the invention shown in FIG. 5, the cover belt system run is deflected by 90°. The cover belt system consists of the conveyor belts 410 and 420, wherein the conveyor belt 410 is guided as lower or second belt over the cylinder rollers 450, 451 and 452. The first conveyor belt 420 is guided over the main cylinder roller 440. Similar to FIG. 3, the short belt 430 winds around the main cylinder roller 440 and the secondary cylinder roller 441 to form a guide AB for the outgoing articles from cylinder roller 440 to secondary cylinder roller 452.

Figure 6:
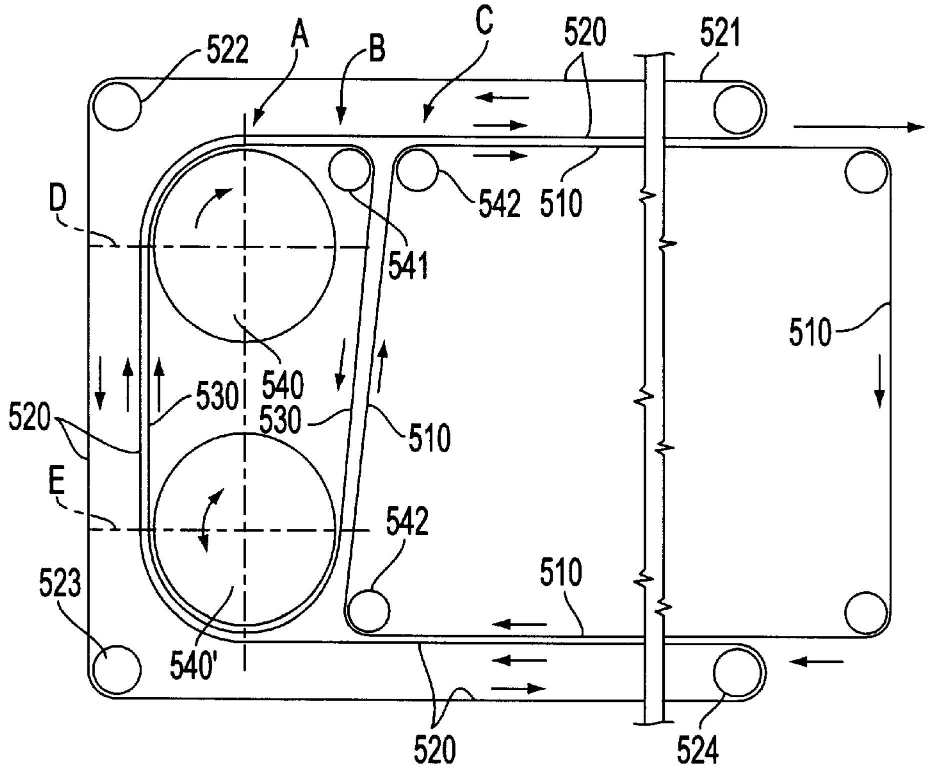
FIG. 6 is an exemplary embodiment of the invention FIG. 4 with a 180° deflection.

FIG. 6 shows an exemplary embodiment of the invention with two main cylinder rollers 540 and 540'. The arrangement of two main cylinder rollers 540, 540' makes it possible to select an optional distance between the linear segments of the cover belts. With increasing distance, the disadvantage of the differential speed in the range between D and E has increasingly more bearing. The upper belt 520 is guided and deflected over cylinder rollers 540 in the deflection mechanism and 540' and further deflected via the cylinder rollers 521 to 524. A secondary cylinder roller 541 is placed between the main cylinder roller 540 and the one of the secondary cylinder rollers 542 which deflects the belt 510 at the transfer point C. In one linear segment, the conveyor belts 510 and 520 run parallel to each other and form a cover belt system there. A short guide belt 530 winds around the cylinder rollers 540, 540' and 541. In the AB area at the output area of the cylinder roller 540, this belt 530 provides a guide for outgoing articles to the transfer point C where the article is transferred to the cover belts 510–520 for transport there between.

Not shown in the drawings, but self-evident to the expert is a drive mechanism for conveyor belts 10*a* and 10*b*, which, for example, can operate via a drive shaft for cylinder rollers 20, 30, 40, 50 or 60 or via a separate drive module.

We claim:

1. Device for transporting flat articles with a cover belt, consisting of a lower and an upper belt, between which the articles are transported, and with a deflection mechanism for deflecting the cover belt run, and wherein: the deflection mechanism has one or more main cylinder rollers and one or more secondary cylinder rollers; the upper belt is guided around and by the main cylinder roller and the lower belt is guided by and over the secondary cylinder rollers, so that the lower belt is guided past the main cylinder roller such that the articles are transported in the deflection mechanism between the upper belt and the main cylinder roller; an additional secondary cylinder roller is coordinated with the main cylinder roller and is arranged between the main cylinder roller and the secondary cylinder roller that guides the lower belt; and a short elastic belt is placed around the main cylinder roller and the coordinated secondary cylinder roller such that the short belt provides a guide for articles that are outgoing in the area of the main cylinder roller to a transfer point (C) from the deflection mechanism to a position between the lower and upper belts of the cover belt.

2. Device according to claim 1, wherein said deflection mechanism has two main cylinder rollers, and said short belt extends around and is guided by both main cylinder rollers.

3. Device according to claim 1, wherein the main cylinder roller has a substantially larger diameter than the secondary cylinder rollers.

4. Device according to claim 1, wherein a deflection of the cover belt run by 180° is provided and the deflection mechanism has a main cylinder roller for guiding the upper belt, and two secondary cylinder rollers for guiding the lower belt.

5. Device according to claim 4, wherein a deflection of the cover belt run by 90° is provided and the deflection mechanism has a main cylinder roller for guiding a upper belt, and three secondary cylinder rollers for guiding the lower belt.

6. Device according to claim 5, wherein a plurality of deflection mechanisms are provided and the cover belt run is arranged in a meandering shape.

7. Device for transporting flat articles comprising a cover belt system consisting of a lower and an upper belt between which the articles are transported, and a deflection mechanism for deflecting the cover belt run of the lower and upper belts, and wherein: the deflection mechanism has a main cylinder roller and at least two secondary cylinder rollers; in the deflection mechanism, the upper belt is guided around and by the main cylinder roller and the lower belt is guided over the at least two secondary cylinder rollers to cause the lower belt to be guided past but not around the main cylinder roller such that the articles are transported in the deflection mechanism between the upper belt and the main cylinder roller while in contact with the upper belt; an additional secondary cylinder roller is coordinated with the main cylinder roller and is arranged between the main cylinder roller and the one of said at least two secondary cylinder rollers that guides the lower belt down-stream of the main cylinder roller; and a short elastic belt is placed around the main cylinder roller and the additional coordinated secondary cylinder roller such that the article are dispersed between and in contact with both the upper belt and the short elastic belt which provides a guide to said one of the at least two secondary cylinder rollers for articles that are outgoing in the area of the main cylinder roller.

8. Device according to claim 7, wherein the main cylinder roller has a substantially larger diameter than the secondary cylinder rollers.

9. Device according to claim 7, wherein a deflection of the cover belt run by 180° is provided and the deflection mechanism has a main cylinder roller for guiding the upper belt and two secondary cylinder rollers for guiding the lower belt.

10. Device according to claim 7, wherein a deflection of the cover belt run by 90° is provided and the deflection mechanism has a main cylinder roller for guiding the upper belt and three secondary cylinder rollers for guiding the lower belt.

11. Device according to claim 7, wherein a plurality of deflection mechanisms are provided and the cover belt run is arranged in a meandering shape.

12. Device according to claim 7, wherein said deflection mechanisms has two main cylinder roller and the short belt extends around and is guided by both main cylinder rollers.

13. Device for transporting flat articles comprising: a cover belt system including a first and a second belt running generally parallel to one another and between which the articles are transported, and a deflection mechanism for deflecting the run of the first and second belts, and wherein: the deflection mechanism has one or more main cylinder rollers and at least two secondary cylinder rollers; in the deflection mechanism, the first belt is guided around and by the main cylinder roller and the second belt is guided over and by the at least two secondary cylinder rollers to cause the second belt to be guided past the main cylinder roller such that the articles are transported in the deflection mechanism between the first belt and the main cylinder roller; an additional secondary cylinder roller is coordinated with the main cylinder roller and is arranged adjacent to the output of the deflection mechanism between the main cylinder roller and one of said secondary cylinder rollers that guides the lower belt; and a short elastic belt is placed around the main cylinder roller and the additional coordinated secondary cylinder roller, and beneath the first belt, such that the articles in the deflection mechanism are in contact with and held by the first belt and the short elastic belt, and the short belt provides a guide, for articles that are outgoing in a area of the main cylinder roller, to the transfer point (C) for the articles to a position between the first and second belts.

14. Device according to claim 13, wherein the main cylinder roller has a substantially larger diameter than the secondary cylinder rollers.

15. Device according to claim 13, wherein a deflection of the cover belt run by 180° is provided and the deflection mechanism has a main cylinder roller for guiding the first belt, and two secondary cylinder rollers for guiding the second belt.

16. Device according to claim 13, wherein a deflection of the cover belt run by 90° is provided and the deflection mechanism has a main cylinder roller for guiding the first belt and three secondary cylinder rollers for guiding the second belt.

17. Device according to claim 13, wherein a plurality deflection mechanisms are provided and the cover belt run is arranged in a meandering shape.

18. Device according to claim 13, wherein the deflection mechanism has two spaced main cylinder rollers and the short belt extends around and is guided both main cylinder rollers.

* * * * *